United States Patent
Matsuzawa et al.

(10) Patent No.: US 11,716,929 B2
(45) Date of Patent: Aug. 8, 2023

(54) WORKING PART STRUCTURE OF LAWNMOWER

(71) Applicant: HONDA MOTOR CO., LTD., Tokyo (JP)

(72) Inventors: Kohei Matsuzawa, Wako (JP); Kotaro Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 614 days.

(21) Appl. No.: 16/794,949

(22) Filed: Feb. 19, 2020

(65) Prior Publication Data

US 2020/0305346 A1 Oct. 1, 2020

(30) Foreign Application Priority Data

Mar. 29, 2019 (JP) .............................. JP2019067459

(51) Int. Cl.
*A01D 34/82* (2006.01)
*A01D 34/73* (2006.01)
*A01D 101/00* (2006.01)

(52) U.S. Cl.
CPC ......... *A01D 34/828* (2013.01); *A01D 34/733* (2013.01); *A01D 2101/00* (2013.01)

(58) Field of Classification Search
CPC ................ A01D 34/828; A01D 34/733; A01D 2101/00; A01D 34/736
See application file for complete search history.

(56) References Cited

U.S. PATENT DOCUMENTS

| 3,683,606 A | * | 8/1972 | Staines | A01D 34/733 56/295 |
| 3,911,652 A | * | 10/1975 | Houle | A01D 34/73 56/295 |
| 4,229,933 A | * | 10/1980 | Bernard | A01D 34/733 56/295 |
| 4,815,264 A | * | 3/1989 | Mijnders | A01D 34/736 56/13.6 |
| 5,791,131 A | * | 8/1998 | Hill | A01D 34/733 56/DIG. 9 |

(Continued)

FOREIGN PATENT DOCUMENTS

DE 202006008527 U1 7/2006
JP H02137821 U 11/1990

(Continued)

OTHER PUBLICATIONS

German PTO Office Action for German Application 102020201994.0 dated Oct. 28, 2020; 25 pp.

*Primary Examiner* — Drew J Brown
(74) *Attorney, Agent, or Firm* — Armstrong Teasdale LLP (57) ABSTRACT

A working part (13) of a lawnmower (10) includes a disk (20) rotatably supported by a main body of the lawnmower and configured to be rotated by a power source (15), a blade (36) having a base end portion (46) rotatably attached to an outer peripheral part of the disk via a pivot shaft (32) and a free end portion (47) configured to protrude radially outward from an outer peripheral edge of the disk, and a blade guard (37) having a base end portion (51) rotatably supported by the pivot shaft and a free end portion (52) overlying the free end portion of the blade.

9 Claims, 9 Drawing Sheets

(56) References Cited

U.S. PATENT DOCUMENTS

| | | | |
|---|---|---|---|
| 7,290,383 B2* | 11/2007 | Harris | A01D 34/736 56/255 |
| 7,743,478 B2* | 6/2010 | Thompson | A01D 34/733 56/13.6 |
| 8,893,461 B2* | 11/2014 | Nikkei | A01D 34/733 56/255 |
| 9,480,201 B2 | 11/2016 | Maruyama et al. | |
| 9,801,337 B2 | 10/2017 | Kasai et al. | |
| 2016/0360695 A1* | 12/2016 | Klackensjö | A01D 34/736 |
| 2020/0128730 A1* | 4/2020 | Nakano | A01D 34/736 |

FOREIGN PATENT DOCUMENTS

| | | |
|---|---|---|
| JP | 2013162764 A | 8/2013 |
| JP | 2016185099 A | 10/2016 |
| WO | 2020192173 A1 | 10/2020 |

\* cited by examiner

WORKING PART STRUCTURE OF LAWNMOWER

TECHNICAL FIELD

The present invention relates to a working part structure of a lawnmower.

BACKGROUND ART

JPH02-137821U and JP2013-162764A disclose a structure for the working part of a lawnmower in which a plurality of blades are pivotally attached to a peripheral part of a rotating disk which is received in a cutter housing and rotates in a substantially horizontal plane. The peripheral part of the rotating disk is downwardly offset relative to the central part of the rotating disk, and each blade is pivotally supported on the lower surface of the peripheral part of the rotating disk via a vertically extending pivot shaft. As the rotating disk rotates around the drive shaft thereof, the blades are caused to extend in the radially outer direction under a centrifugal force to cut the grass. When the blades hit a solid object such as stones and wood pieces, the blades are deflected away from the foreign objects without being subjected to an excessive force.

In the working part structure of a lawnmower disclosed in JP2016-185099A, the rotating disk is provided with a protective structure for each individual blade. An opening is formed in a part of the rotating disk located immediately radially outer side of the pivot shaft of each blade, and the part of the rotating disk located between the radially outer edge of the opening and the radially outer edge of the rotating disk are raised upward relative to the remaining part of the rotating disk. The base end portion of each blade is pivotally attached to the upper side of the rotating disk, and the free end portion of the blade is passed through the opening and extend past the lower side of the peripheral part of the rotating disk which is raised upward. Each raised part of the rotating disk serves as the protective structure for the corresponding blade.

Figure 9A:
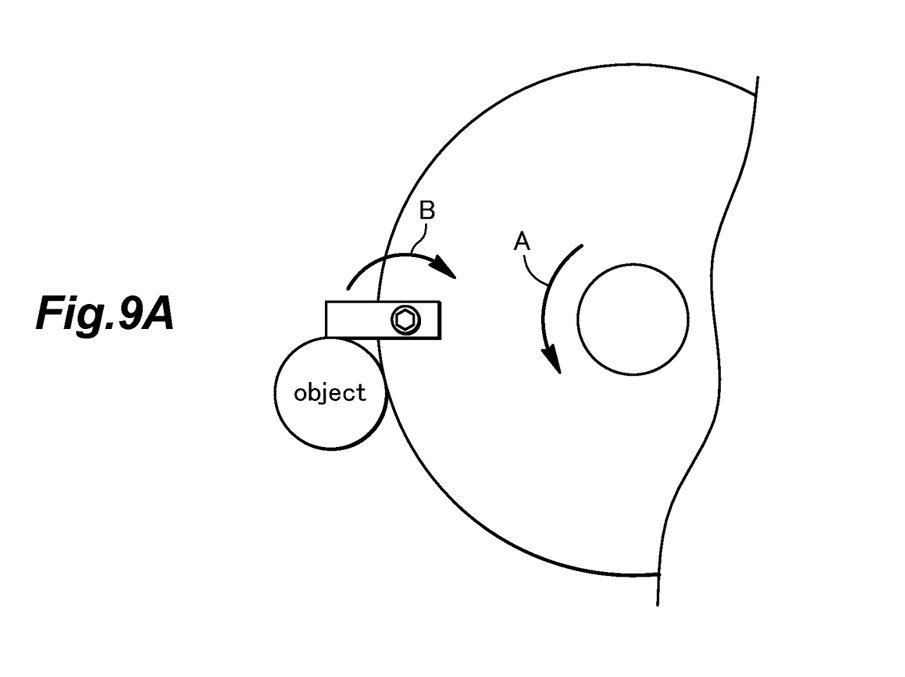
FIG. 9A and FIG. 9B are schematic plan views showing the cause of repeated loading of the blade.

However, according to the conventional working part structure of a lawnmower such as the one disclosed in JPH02-137821U, the blades are subjected to repeated stressing, and are known to fail sooner than expected owing to metal fatigue. This is at least partly due to the fact that each blade tends to hit a foreign object not once but multiple times. As shown in FIG. 9A, when the disk is rotating in counterclockwise direction as indicated by the arrow A, and one of the blades hits the object, the blade bounces back in clockwise direction as indicated by the arrow B. In doing so, the blade hits the object once again from the opposite direction. Therefore, the blades are required to be strong enough to withstand such repeated loading.

The working part structure of a lawnmower disclosed JP2016-185099A is protected from such repeated loading because a relatively small part of each blade is exposed, but suffers from the problem of lacking in the capability to aggressively cut the grass. Also, the provision of the protective structure adds to the moment of inertia of the disk so that the power consumption is increased, and a longer time period is required for the rotating disk to come to a stop.

The damage to the blade can be mitigated by using a softer material for the blade. However, the use of a softer material causes the blade to wear down faster.

SUMMARY OF THE INVENTION

In view of such a problem of the prior art, a primary object of the present invention is to provide a working part structure of a lawnmower which can minimize the damage and wear of the blade thereof in use.

To achieve such an object, the present invention provides a structure of a working part (13) of a lawnmower (10), comprising: a disk (20) rotatably supported by a main body (11) of the lawnmower and configured to be rotated by a power source (15); a blade (36) having a base end portion (46) rotatably attached to an outer peripheral part of the disk via a pivot shaft (32) and a free end portion (47) configured to protrude radially outward from an outer peripheral edge of the disk; and a blade guard (37) having a base end portion (51) rotatably supported by the pivot shaft and a free end portion (52) overlying the free end portion of the blade.

Since the free end portion of the blade guard is disposed so as to overlie the free end portion of the blade, preferably in close proximity, when the free end portion of the blade comes into contact with a hard object, the resulting force is distributed to both the blade guard and the blade. Therefore, the risk of damage to the blade is reduced. Further, since the blade is less likely to be damaged, a material having a high hardness can be used for the blade so that wear of the blade can be reduced and the service life of the blade can be extended.

Preferably, the working part further comprises a retaining feature (44) configured to substantially prevent a relative rotation between the blade and the blade guard.

Thereby, the blade guard can be substantially fixedly positioned on the blade so that the guarding action of the blade guard can be ensured without regard to the angular position of the blade, and the cutting action of the blade can be ensured at all times.

Preferably, the retaining feature comprises a blade holder (35) including a holder main body (41) interposed between the blade and the disk and rotatably supported by the pivot shaft and a pair of upright pieces (44) which are bent from either side edge of the holder main body and extend past either side edge of the blade and either side edge of the blade guard.

By using a highly simple structure, the blade guard can be kept substantially rotationally fast with the blade. Since the main body of the blade holder is interposed between the blade and the disk, the wear of the blade which could be otherwise caused by a sliding engagement with the disk can be avoided.

Preferably, the blade holder further includes an end upright piece (45) which is bent from a base end edge of the holder main body and extends past a base end edge of the blade and/or a base end edge of the blade guard.

The upright piece prevents the blade and the blade guard from being assembled in an incorrect orientation so that the management of the assembling process can be simplified.

Preferably, the blade guard is placed on top of the blade.

Thereby, the cutting capability of the blade is not impaired by the presence of the blade guard. Typically, the blade guard and the blade are placed on the upper surface of the disk. In such a case, the blade is interposed between the blade guard and the blade. When the blade guard and the blade are placed on the lower surface of the disk, the blade guard is interposed between the blade and the disk. In either case, the blade guard is prevented from rubbing against the cut edges of the grass so that the grass cutting quality of the lawnmower is ensured.

Preferably, the blade guard is tapered toward a free end thereof, and is narrower than the blade at least in the free end portion thereof.

Thereby, the blade guard is prevented from interfering with the cutting action of the blade even when the blade guard should move by a small angle relative to the blade.

Preferably, the free end portion of the blade guard projects radially outward beyond a free end edge (49) of the blade.

Thereby, the impact received by the blade when coming into contact with a foreign object can be effectively minimized.

Preferably, the blade guard is made of a material softer than that of the blade.

Thereby, the blade guard can favorably absorb the impact so that the damage to the blade can be minimized.

Preferably, the pivot shaft comprises a threaded bolt (28) passed through the base end portions of the blade and the blade guard, and a flanged nut (29) is fastened to the threaded bolt, the flanged nut being provided with a spacer collar (31).

Thereby, the blade guard is prevented from peeling away from the blade so that the blade can be firmly held down by the blade guard at all times.

Preferably, the blade guard is interposed between the disk and the blade, and the blade holder is integrally formed with the blade guard.

Thereby, the necessary number of component parts can be reduced, and assembly work can be facilitated.

The present invention thus provides a working part structure of a lawnmower which can minimize the damage and wear of the blade thereof in use.

DESCRIPTION OF THE PREFERRED EMBODIMENT(S)

A lawnmower 10 according to the first embodiment of the present invention is described in the following with reference to FIGS. 1 to 6.

First Embodiment

Figure 1:
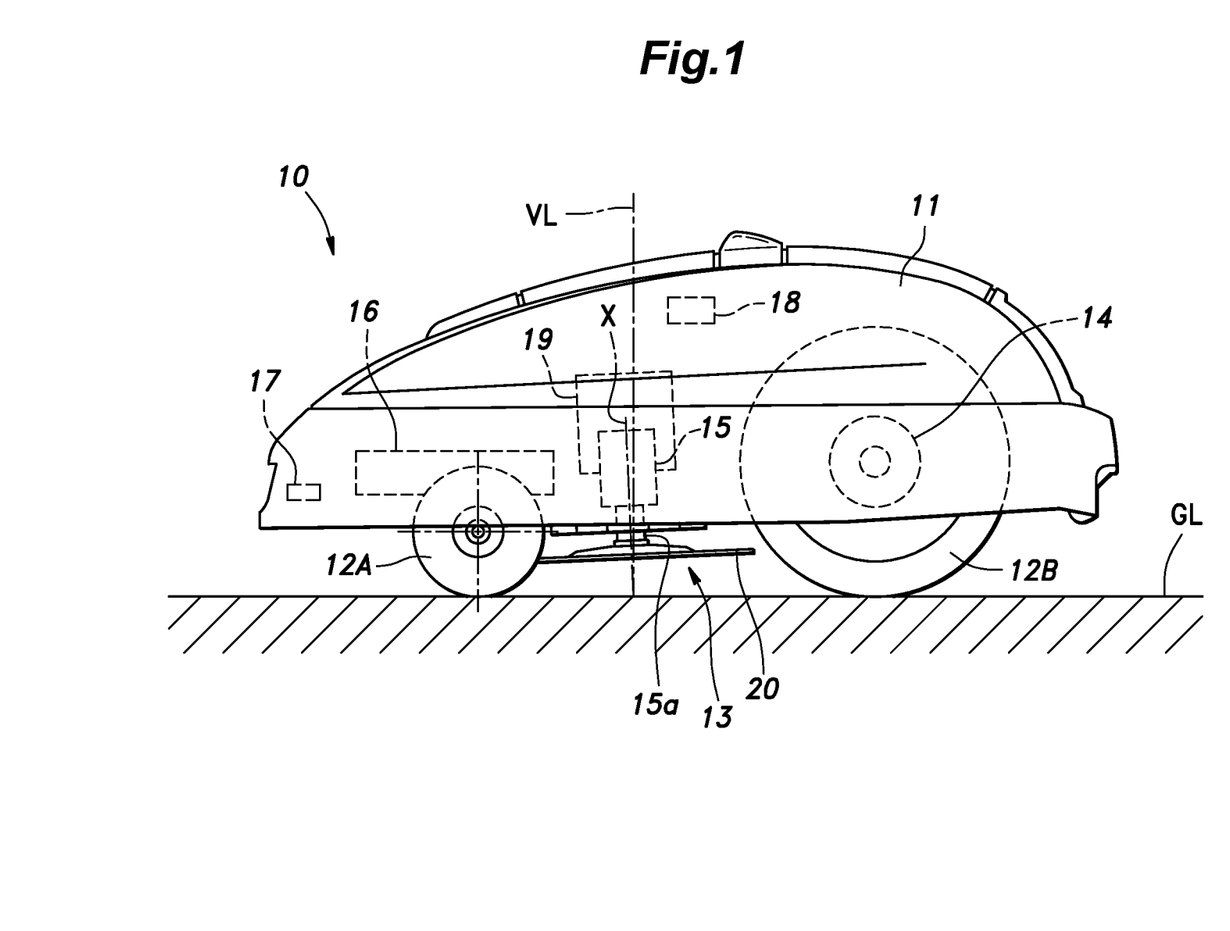
FIG. 1 is a side view of a lawnmower according to a first embodiment of the present invention.

FIG. 1 is a side view of the lawnmower 10 according to the first embodiment of the present invention. As shown in FIG. 1, the lawnmower 10 consists of a robotic or autonomous lawnmower that can travel and cut grass autonomously. The lawnmower 10 includes a lawnmower main body 11 having a housing, a plurality of wheels 12 (12A, 12B) provided on the lawnmower main body 11, and a lawnmower working part 13 provided centrally in a lower part of the lawnmower main body 11. The wheels 12 include a pair of front wheels 12A provided on either side of a front part of the lawnmower main body 11 and a pair of rear wheels 12B provided on either side of a rear part of the lawnmower main body 11. The two rear wheels 12B can be individually driven by corresponding travel motors 14 consisting of electric motors. The working part 13 is driven by a mowing motor 15 consisting of an electric motor provided separately from the travel motors.

The lawnmower main body 11 is provided with a battery 16 for supplying electric power to the left and right travel motors 14 and the mowing motor 15 which serves as the power source for the working part 13. Furthermore, the lawnmower main body 11 is provided with various sensors 17 and a control unit 18 that controls the operation of the travel motors 14 and the mowing motor 15 according to the detection signals obtained by the various sensors 17. The sensors 17 include an obstacle detection sensor (for example, a contact sensor), an angular velocity sensor, and an acceleration sensor. When the left and right travel motors 14 rotate forward or rearward at a same speed, the lawnmower 10 travels straight forward or rearward. The lawnmower 10 is enabled to turn left or right by rotating the corresponding travel motor 14 faster than the other travel motor 14.

The mowing motor 15 is supported by the lawnmower main body 11 via s lifting mechanism 19. The lifting mechanism 19 raises or lowers the mowing motor 15 when an operating lever is operated by an operator or according to a command from the control unit 18 so that the elevation of the working part 13 with respect to the ground surface GL may be adjusted.

The mowing motor 15 has a rotary shaft 15a (output shaft) that extends downward from the lawnmower main body 11 toward the ground surface GL (turf). The rotary shaft 15a of the mowing motor 15 extends in the vertical direction, and is substantially perpendicular to the ground surface GL during the normal operation of the lawnmower 10. Preferably, the rotary shaft 15a is slightly tilted forward with respect to the vertical direction so that the rear part of the working part 13 is prevented from rubbing against the surface of the turf as the lawnmower 10 travels forward and mows the grass with the working part 13.

Figure 2:
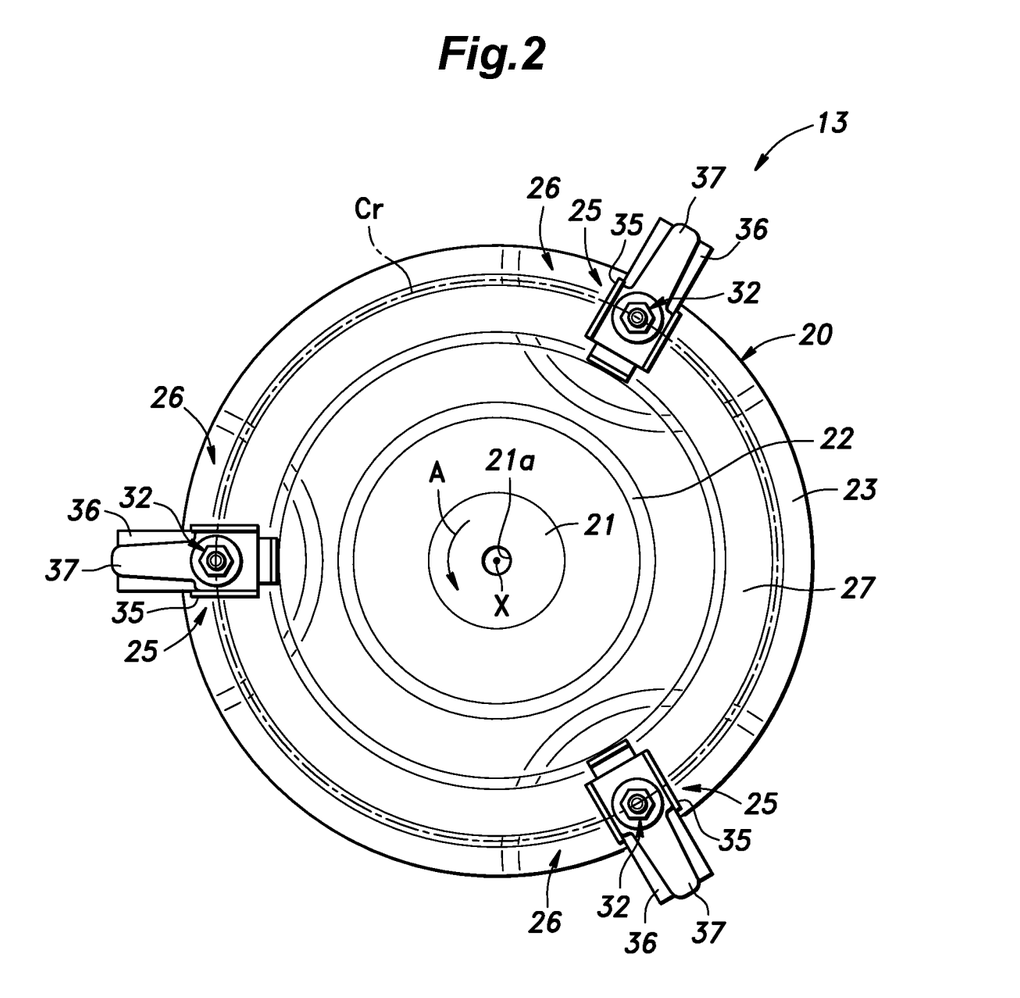
FIG. 2 is a plan view of a working part of the lawnmower.
Figure 3:
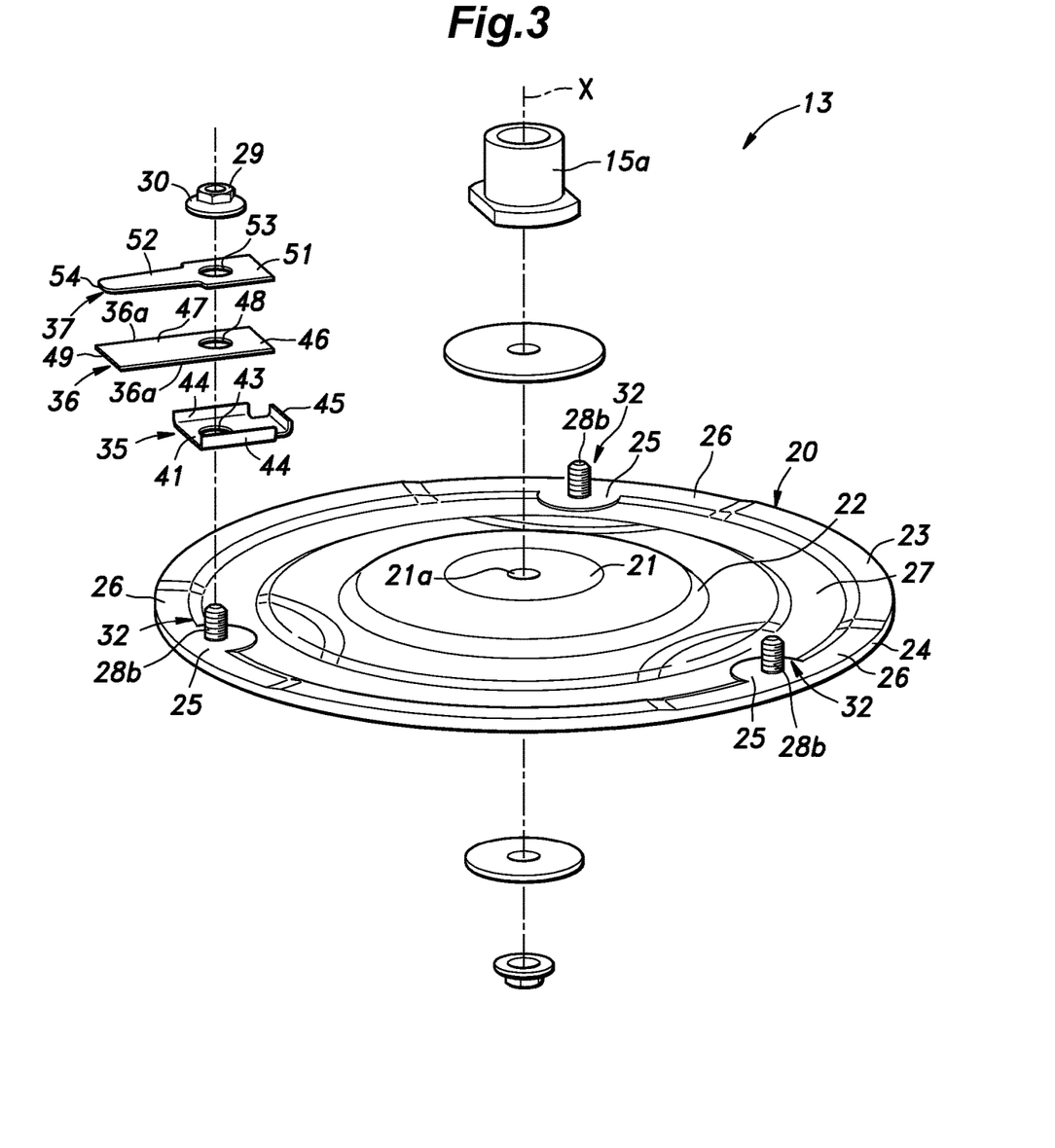
FIG. 3 is an exploded perspective view of the working part.

FIG. 2 is a plan view of the working part 13, and FIG. 3 is an exploded perspective view of the working part 13. As shown in FIGS. 2 and 3, the working part 13 is provided with a disk 20 that is fixed to the rotary shaft 15a so as to rotate (around the vertical axis X) with the rotary shaft 15a. The disk 20 is rotationally driven by the mowing motor 15 in counterclockwise direction in top view as indicated by the arrow A in FIG. 2. The disk 20 may consist of a stamp formed sheet metal member in the form of a circular disk.

The central part of the disk 20 (with respect to the vertical axis X of the rotary shaft 15a) is formed as a flat annular portion or a base portion 21 which has a central mounting hole 21a for passing through the lower end of the rotary shaft 15a. The outer periphery of the base portion 21 is connected to an annular conical portion 22 slightly slanting downward in the radially outer direction, and the radially outer edge of the conical portion 22 is connected to an annular planar portion 23 which is substantially parallel to the base portion 21. The outer peripheral edge of the annular planar portion 23 is provided with an annular flange 24 which is bent downward from the annular planar portion 23 and has a lower edge located on a plane orthogonal to the vertical axis X.

The annular planar portion 23 or the radially outer part of the disk 20 is provided with a plurality of blade mounting portions 25. In this embodiment, three blade mounting portions 25 are provided on the disk 20. The blade mounting portions 25 are arranged at regular angular intervals along a reference circle Cr (FIG. 2) concentric to the vertical axis X of the disk 20. The annular planar portion 23 is provided with three semicircular recesses 26 each recessed downward in substantially semicircular shape centered around the corresponding blade mounting portion 25, and has a planar upper surface. The semicircular recesses 26 each extend to the outer peripheral edge of the disk 20. As a result, the height of the flange 24 is reduced in the parts thereof corresponding to the respective semicircular recesses 26.

The annular planar portion 23 is further provided with an annular recess 27 which is recessed downward by a substantially same depth as the semicircular recesses 26 and in a concentric relationship to the vertical axis A. The annular recess 27 is located in a radially intermediate part of the annular planar portion 23. Thus, the annular recess 27 connects the semicircular recesses 26 along the circumferential direction, and increases the overall bending stiffness of the disk 20.

Figure 4:
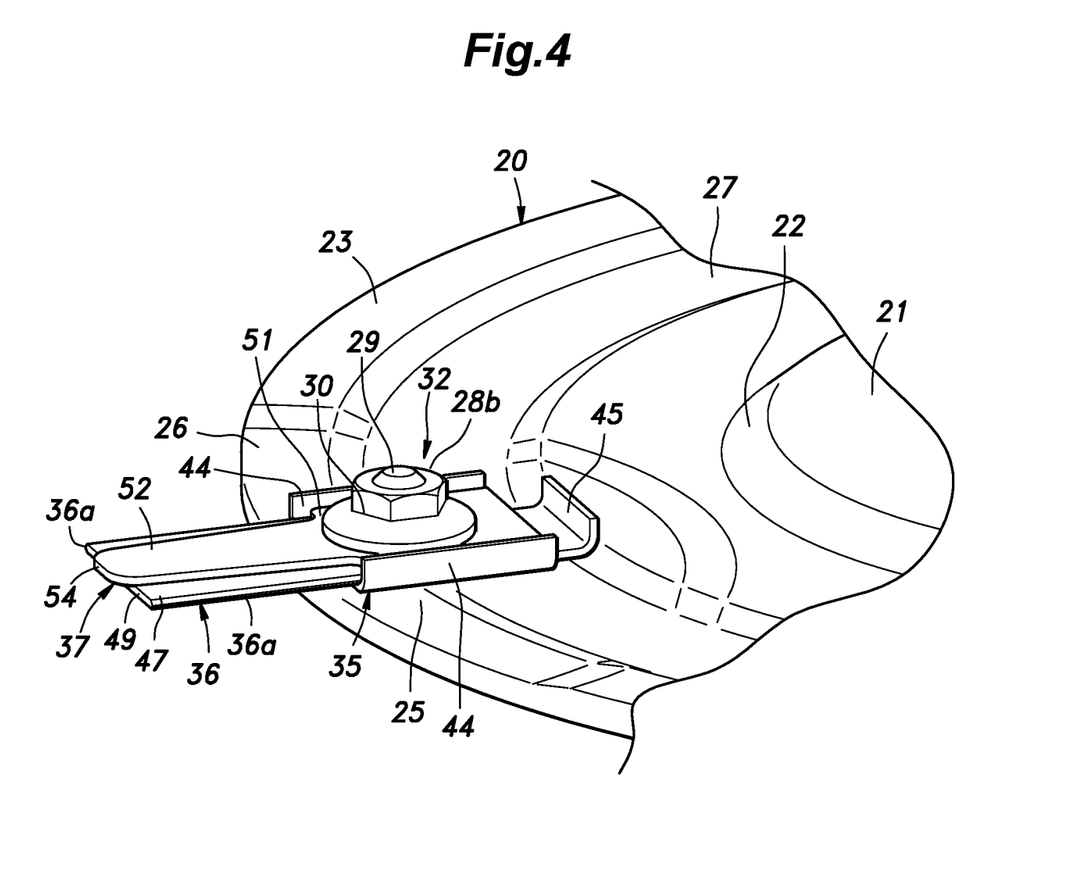
FIG. 4 is a fragmentary perspective view of the working part.
Figure 5:
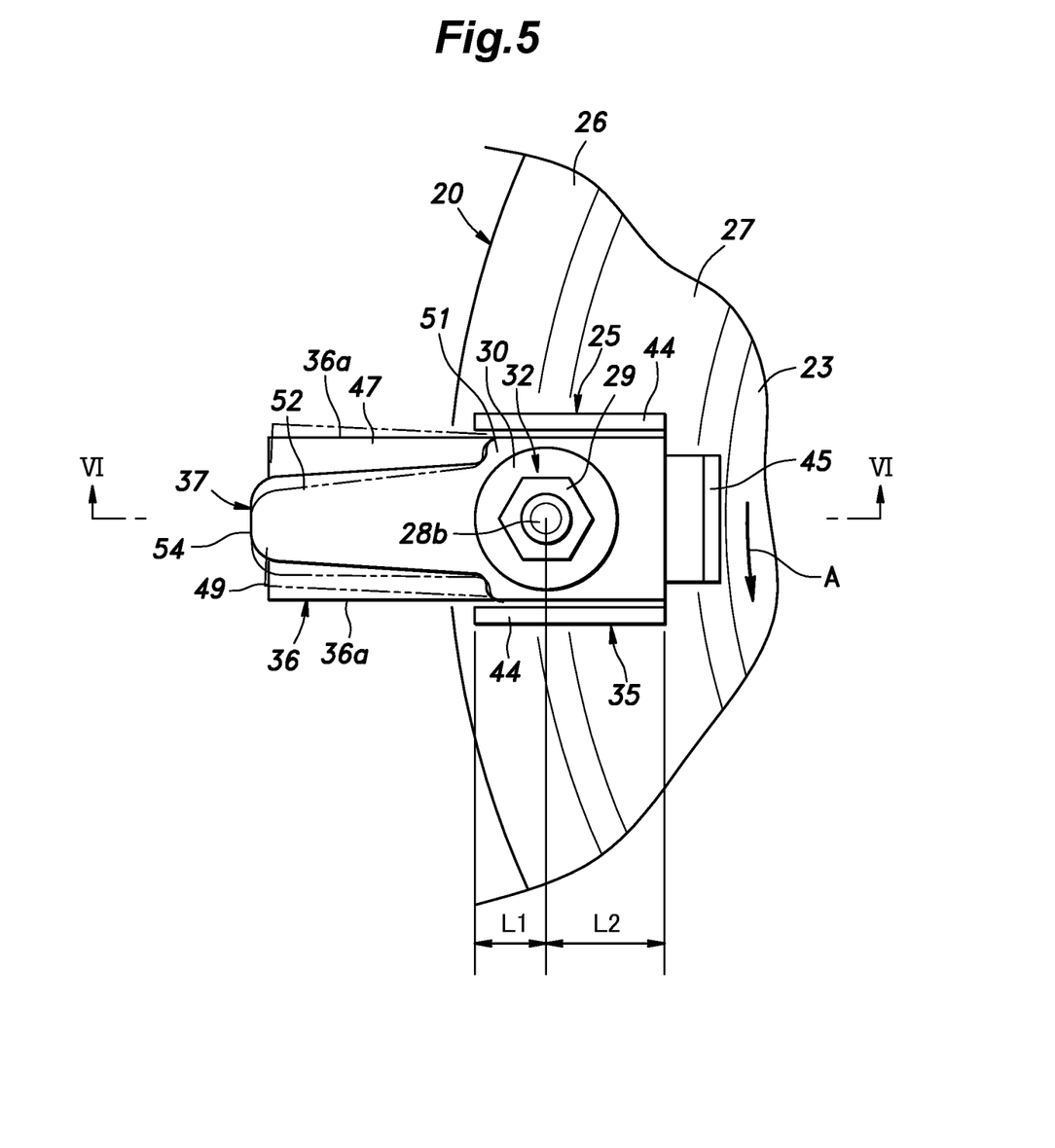
FIG. 5 is a fragmentary plan view of the working part.
Figure 6:
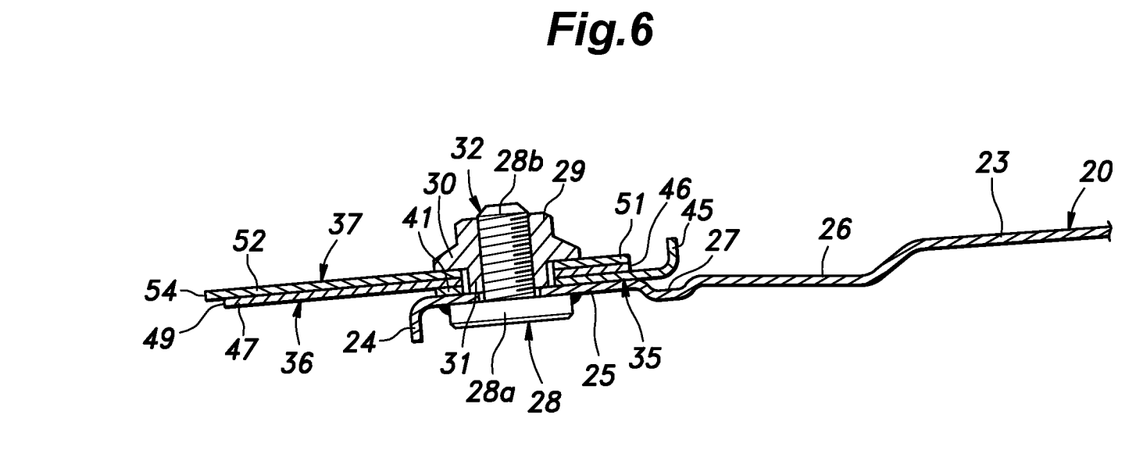
FIG. 6 is a sectional view taken along line VI-VI in FIG. 5.

FIG. 4 is a fragmentary perspective view of the working part 13. FIG. 5 is a fragmentary plan view of the working part, and FIG. 6 is a sectional view taken along line VI-VI in FIG. 5. As shown in FIGS. 3 to 6, each blade mounting portion 25 is formed by a part of the disk 20 which is planar and slightly inclined downward in the radially outward direction as compared with the base portion 21. A bolt mounting hole is formed in the blade mounting portion 25, and a bolt 28 is passed upward into the bolt mounting hole from below. The head 28a (FIG. 6) of the bolt 28 is welded to the lower surface of the blade mounting portion 25. The shank 28b of the bolt 28 extends upward through the blade mounting portion 25, and the upper surface of the blade mounting portion 25 provides a seat surface for blade mounting. The shank 28b of the bolt 28 extends orthogonally to the upper surface of the blade mounting portion 25, and is therefore slightly tilted in a radially outward direction with respect to the vertical axis X of the disk 20.

A nut 29 is threaded onto the shank 28b of the bolt 28. The nut 29 consists of a flanged nut having a flange 30 integrally formed therewith to provide an annular surface configured to abut against an object to be fastened. The nut 29 is further provided with a spacer collar 31 (see FIG. 5) extending coaxially and downward from the lower surface of the annular surface of the nut 29. The threaded inner bore of the nut 29 extends the entire axial length thereof including the spacer collar 31. When the nut 29 is threaded onto the bolt 28, the lower end surface of the spacer collar 31 abuts against the upper surface of the blade mounting portion 25. When the nut 29 is fully fastened to the bolt 28, a certain gap is created between the upper surface of the blade mounting portion 25 and the annular surface of the flange 30. The spacer collar 31 of the nut 29 serves a pivot shaft 32 jointly with the shank 28b of the bolt 28 as will be described hereinafter.

A blade holder 35, a blade 36, and a blade guard 37 are arranged in each blade mounting portion 25, and these are rotatably held by the bolt 28 and the nut 29. In particular, the blade holder 35, the blade 36, and the blade guard 37 are each provided with a hole 43, 48, 53 which has a slightly greater inner diameter than the outer diameter of the spacer collar 31, and the spacer collar 31 is positioned in the holes 43, 48 and 53 of the blade holder 35, the blade 36, and the blade guard 37. The gap between the upper surface of the blade mounting portion 25 and the annular surface of the flange 30 is slightly wider than the combined thickness of the blade holder 35, the blade 36, and the blade guard 37. The blade holder 35, the blade 36, and the blade guard 37 are thus retained by the pivot shaft 32 formed by the spacer collar 31 in a rotatable manner. As will be discussed hereinafter, when the disk 20 is rotated, the blade holder 35, the blade 36, and the blade guard 37 are directed in the radial direction under a centrifugal force.

In the present embodiment, the blade holder 35 is mounted on the upper surface of the blade mounting portion 25, the blade 36 is mounted on the upper surface of the blade holder 35, and the blade guard 37 is mounted on the upper surface of the blade 36. Thus, the upper surface of the blade mounting portion 25 provides a support surface that rotatably supports the blade holder 35.

As shown in FIG. 3, the blade holder 35 consists of a stamp formed sheet metal member, and includes a holder main body 41 that slides on the upper surface of the blade mounting portion 25. The holder main body 41 has a rectangular shape, and the hole 43 of the blade holder 35 is formed in an inner end part (during normal operation) of the holder main body 41. The diameter of the through hole 43 is slightly larger than the outer diameter of the spacer collar 31 of the nut 29 so that the blade holder 35 can freely rotate about the pivot shaft 32. The holder main body 41 is sized and shaped so as not to protrude from the outer peripheral edge of the disk 20 at all times. A pair of side upright pieces 44 are bent upright from either side edge of the holder main body 41. The side edges of the holder main body 41 may be considered as a leading and a trailing edge when the blade holder 35 rotates around the pivot shaft 32. Another upright piece or an end upright piece 45 is bent upright from the inner edge (during normal operation) of the holder main body 41. This upright piece 45 is provided for the purpose of preventing an incorrect assembling of the blade 36 and the blade guard 37 as will be discussed hereinafter.

The blade 36 is formed of a substantially rectangular flat metal plate member. The blade 36 is made of a material (typically consisting of hardened steel) which is harder than the blade holder 35 (typically made of mild steel). The blade 36 is provided with a pair of cutting edges 36a on either side edge thereof extending in the longitudinal direction. The blade 36 is provided with a base end portion 46 that is disposed so as to overlie the blade mounting portion 25 with the holder main body 41 interposed therebetween, and a free end portion 47 that can protrude outward from the outer peripheral edge of the disk 20 depending on the angular position of the blade 36 relative to the disk 20. The hole 48 of the blade 36 is formed in the base end portion 46 of the blade 36, and the cutting edges 36a of the blade 36 are formed on the side edges of the free end portion 47. The free end edge 49 of the blade 36 extends linearly and orthogonal to the side edges of the blade 36, and the free end edge 49 is not provided with a cutting edge. The center of gravity of the blade 36 is located between the free end edge 49 and the center of the hole 48 so that when the disk 20 is rotated, the free end portion 47 projects radially outward from the outer peripheral edge of the disk 20 under a centrifugal force as shown in FIGS. 2 and 4. In this position, the blade 36 inclines slightly downward in the radially outward direction (see FIG. 6).

Each blade guard 37 consists of a plate member made of softer material than the blade 36 such as mild steel. The blade guard 37 has a base end portion 51 overlying the base end portion 46 of the blade 36 and a free end portion 52 overlying the free end portion 47 of the blade 36. The width of the base end portion 51 of the blade guard 37 is substantially the same as the width of the base end portion 46 of the blade 36. The hole 53 of the blade guard 37 is slightly larger than the outer diameter of the spacer collar 31 of the nut 29, and is formed in the base end portion 51 of the blade guard 37. The free end portion 52 of the blade guard 37 is tapered toward the free end thereof in plan view, and is therefore generally substantially narrower than the free end portion 47 of the blade 36. The free end edge 54 of the blade guard 37 extends beyond the free end edge 49 of the blade 36 and has a rounded shape in plan view. The center of gravity of the blade guard 37 is located between the free end edge 54 and the center of the hole 53. As a result, when the disk 20 is rotated, the blade guard 37 projects radially outward under a centrifugal force as shown in FIGS. 2 and 4.

The blade holder 35 overlies the blade mounting portion 25, the blade 36 overlies the blade holder 35, and the blade guard 37 overlies the blade 36. The blade 36 and the blade guard 37 are positioned between the side upright pieces 44. Owing to the presence of the end upright piece 45 on the blade holder 35, the blade 36 and the blade guard 37 can be assembled to the blade holder 35 only in the correct position in which the free end portions 42, 52 of the blade 36 and the blade guard 37 are positioned remote from the end upright piece 45. In the correctly assembled state, the side upright pieces 44 extend past the side edges of the blade 36 and the blade guard 37 as shown in FIGS. 4 and 5.

As shown in FIG. 5, the side upright pieces 44 abut against the side edges of the blade 36 and the blade guard 37 to so as to restrict the rotation of the blade 36 and the blade guard 37 relative to the blade holder 35, and hence the relative rotation between the blade 36 and the blade guard 37 is restricted. The side upright pieces 44 have a certain longitudinal length. If the holder main body 41, in particular the side upright pieces 44 project radially outward from the outer peripheral edge of the disk 20, the grass is irregularly torn off by the blade holder 35, and the grass cutting quality is impaired. Therefore, the holder main body 41 (or the side upright pieces 44) is arranged such that the radially inner length L1 thereof or the distance between the base end thereof and the center of the hole 48 is greater than the radially outer length L2 or the distance between the free end edge thereof and the center of the hole 48 (L1>L2). In other words, the hole 48 serving as the rotational center of the blade holder 35 is provided at a position offset substantially radially outward with respect to the center of the holder main body 41 (or the side upright pieces 44) in the longitudinal direction.

In the assembling process, with the blade holder 35, the blade 36 and the blade guard 37 placed in the mutually overlying relationship, and the holes 43, 48, 53 aligned with one another, the bolt 28 is received in these holes 43, 48, 53, and the nut 29 is threaded onto the bolt 28 such that the lower end of the spacer collar 31 abuts against the upper surface of the blade mounting portion 25. As shown in FIG. 6, the length of the spacer collar 31 of the nut 29 is slightly larger than the combined thickness of the holder main body 41 of the blade holder 35, the blade 36, and the blade guard 37. Therefore, even when the nut 29 is fully fastened, the blade holder 35, the blade 36, and the blade guard 37 can freely rotate around the bolt 28 or the spacer collar 31 of the nut 29. Since the nut 29 consists of a flanged nut, the blade holder 35, the blade 36, and the blade guard 37 can be rotatably retained to the blade mounting portion 25 in a stable manner. In particular, the vertical position of the free end portion 47 of the blade 36 can be correctly maintained during the operation of the lawnmower.

As shown in FIGS. 2, 3, and 6, the depth and the width of each semicircular recess 26 are determined so as to allow the rotation of the blade holder 35, the blade 36, and the blade guard 37. When the disk 20 is rotated, each blade 36 extends radially outward under a centrifugal force. When the blade 36 hits a hard object, the blade 36 is allowed to rotate around the corresponding pivot shaft 32 provided by the spacer collar 31 away from the hard object so that the blade 36 is protected from an excessive impact, and is prevented from being damaged.

As shown in FIGS. 3 and 5, each blade holder 35 functions as a retaining feature for retaining the blade 36 and the blade guard 37 substantially rotationally fast to each other by retaining the blade 36 and the blade guard 37 between the side upright pieces 44. The side upright pieces 44 are spaced from each other by a distance slightly larger than the width of the base end portion 46 of the blade guard 37 and the base end portion 51 of the blade 36. Therefore, the blade guard 37 and the blade 36 can be assembled to the blade holder 35 without being interfered by the upright pieces 44, but can prevent the blade guard 37 and the blade 36 from rotating relative to each other beyond a substantially small angle.

FIG. 5 shows by imaginary lines a state in which the blade 36 has rotated forward to a maximum extent permitted by the side upright pieces 44, and the blade guard 37 has rotated rearward to a maximum extent permitted by the side upright pieces 44. The spacing between the side upright pieces 44 is determined so that the blade guard 37 does not reach or move beyond the cutting edge 36a of the blade 36. In other words, the width and the tapering of the free end portion 52 of the blade guard 37 are determined in relation to the spacing of the side upright pieces 44 such that the blade guard 37 does not reach or move beyond the cutting edges 36a of the blade 36.

The mode of operation and the various advantages of the working part 13 of the lawnmower 10 which has been described above are now discussed in the following.

During normal operation of the lawnmower 10, each blade 36 is rotatably supported by the pivot shaft 32 (the spacing collar 31) so that the free end portion 47 of the blade 36 is positioned in a radially outward of the base end portion 46 thereof under a centrifugal force as shown in FIGS. 3 and 4. The blade guard 37 is similarly pivotally supported by the pivot shaft 32 at the base end portion 51 thereof, and the free end portion 52 of the blade guard 37 generally overlies the free end portion 47 of the blade 36. Thus, when the blade 36 hits a hard object, the impact applied to the blade 36 is partly supported by the blade guard 37. Also, the vibration caused by the collision of the blade 36 with a foreign object is quickly dampened by the blade guard 37 so that the blade 36 is protected from metal fatigue. The blade guard 37 thus increases the durability of the blade 36.

As discussed above, the blade holder 35 functions as a retaining feature that holds the blade guard 37 substantially rotationally fast to the blade 36. Therefore, the angular position of the blade guard 37 does not substantially deviate from the angular position of the blade 36 so that the blade 36 is enabled to cut grass in a favorable manner. Since the blade guard 37 does not come into contact with the grass, the grass cutting quality can be ensured.

In the present embodiment, the retaining feature is constituted by the blade holder 35 rotatably attached to the pivot shaft 32. The blade holder 35 includes a holder main body 41 (FIG. 3) disposed between the blade 36 and the disk 20, and a pair of side upright pieces 44 projecting vertically from the respective side edges of the holder main body 41 past the side edge of the blade guard 37 and the side edges of the blade 36, respectively. With this simple structure provided by the side upright pieces 44, the blade guard 37 is substantially prevented from rotating relative to the blade 36. Further, since the holder main body 41 of the blade holder 35 is in contact with the disk 20 instead of the blade 36, the blade 36 is prevented from being worn out due to sliding contact with the disk 20.

The blade holder 35 has an end upright piece 45 that projects upward from the base end edge of the holder main body 41. Therefore, when assembling the blade 36 and the blade guard 37, the worker is prevented from assembling the blade 36 and the blade guard 37 incorrectly relative to the blade holder 35.

In the present embodiment, since the blade guard 37 is located on top of the blade 36, the blade guard 37 is prevented from rubbing against the freshly cut edges of the grass so that the whitening of the cut edges of the grass can be avoided. This also contributes to a high grass cutting quality of the lawnmower 10.

Furthermore, as shown in FIG. 5, the blade guard 37 is placed on the blade 36 without protruding from the cutting edges 36a of the blade 36 or otherwise interfering with the cutting edges 36a so that the cutting quality of the grass is ensured. More specifically, the width of the blade guard is selected so as not to reach the cutting edges 36a of the blade 36 when the blade guard 37 is angularly shifted relative to the blade 36 to the maximum extent. In particular, the free end portion 52 of the blade guard 37 is tapered toward the free end edge 54 thereof. Therefore, the area by which the blade guard 37 can overlie the blade 36 without interfering with the cutting edges 36a of the blade 36 is maximized.

Figure 9B:
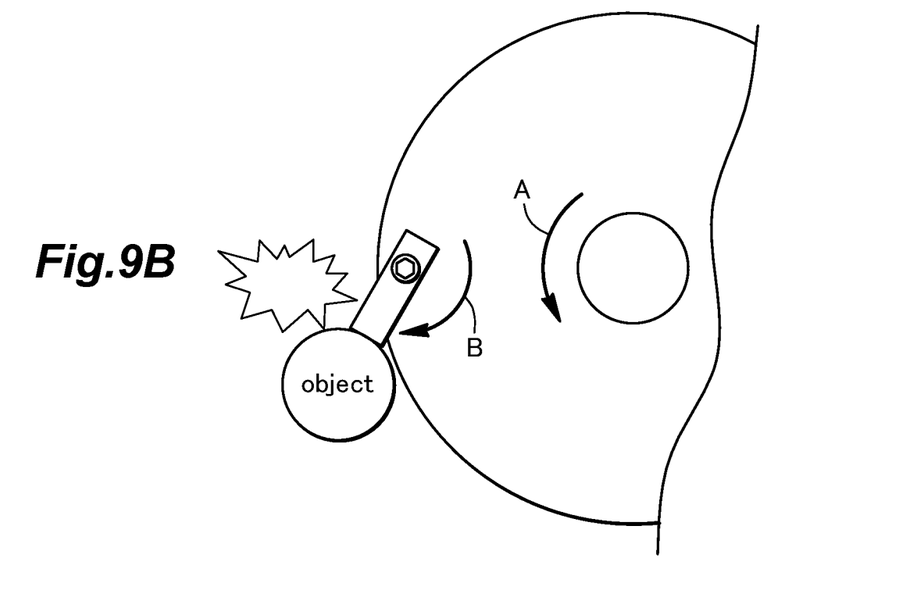

In the present embodiment, the free end portion 52 of the blade guard 37 protrudes slightly beyond the free end edge 49 of the blade 36. This is advantageous because the part of the free end portion 52 of the blade guard 37 protruding from the free end edge 49 of the blade 36 protects the free end edge 49 of the blade 36 from directly colliding with foreign objects. This is particularly the case when the blade guard 37 and the blade 36 rotate around the pivot shaft 32 multiple times after colliding with a foreign object as illustrated in FIGS. 9A and 9B. Alternatively, the free end portion 52 of the blade guard 37 may not protrude beyond the free end edge 49 of the blade 36.

As mentioned earlier, the blade guard 37 is made of a material softer than the blade 36. Therefore, the impact received by the blade 36 when colliding with foreign objects can be absorbed by the bending and other deformations of the blade guard 37, and the damage to the blade 36 can be minimized. Further, the blade guard 37 can be made of an inexpensive material.

As shown in FIG. 6, the pivot shaft 32 of the present embodiment consists of the spacer collar 31 (through which the bolt 28 is passed) which is passed through the holes 43, 48 and 53 of the blade holder 35, the blade 36, and the blade guard 37. The flange 30 of the flanged nut 29 abuts against the upper surface of the blade guard 37, and the lower end of the spacer collar 31 abuts against the upper surface of the blade mounting portion 25 of the disk 20. Therefore, the gap between the flange 30 of the flanged nut 29 and the upper surface of the blade mounting portion 25 can be controlled in a reliable manner so that the blade holder 35, the blade 36, and the blade guard 37 can be pivotally supported by the pivot shaft 32 without substantially tilting and without encountering any undue friction. At the same time, the blade holder 35 can be held against the blade 36 with a proper pressure at all times.

Second Embodiment

A second embodiment of the present invention is described in the following with reference to FIGS. 7 and 8. The parts of the second embodiment corresponding to those of the first embodiment are denoted with like numerals without necessarily repeating the description of such parts in order to avoid unnecessary redundancy.

Figure 7:
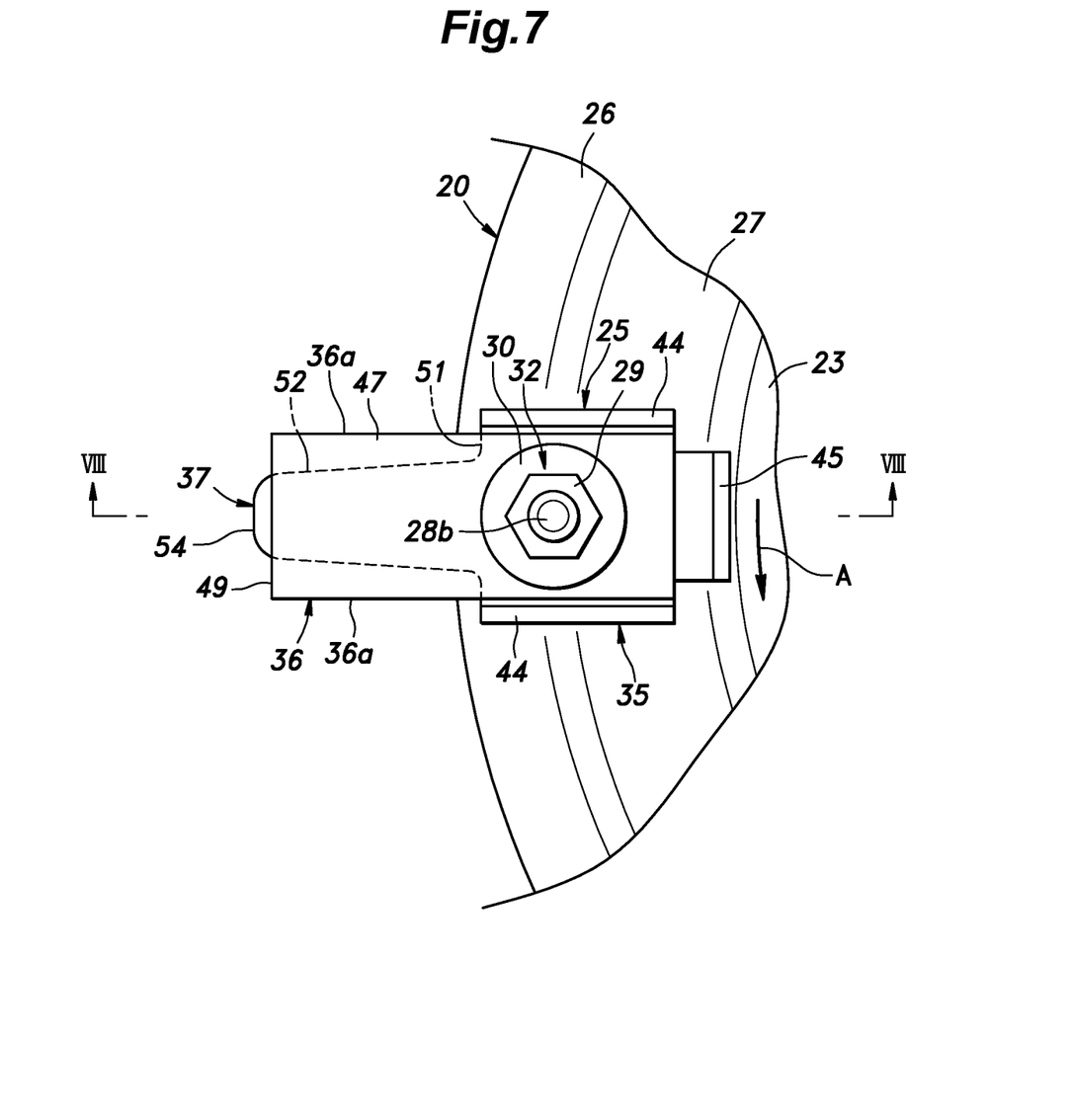
FIG. 7 is a fragmentary plan view of a working part of a lawnmower according to a second embodiment of the present invention.
Figure 8:
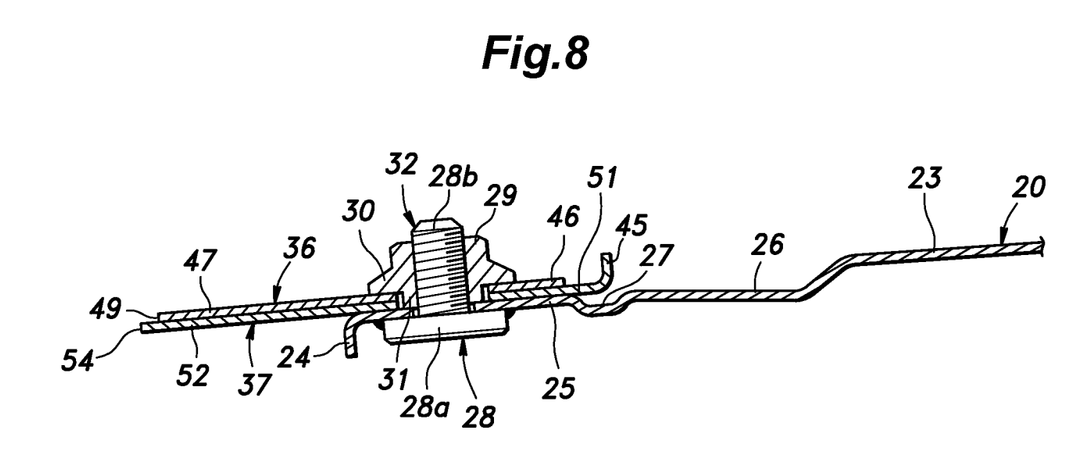
FIG. 8 is a sectional view taken along line VIII-VIII in FIG. 7.

FIG. 7 is a view similar to FIG. 5 showing the working part 13 of the lawnmower 10 according to the second embodiment of the present invention, and FIG. 8 is a sectional view taken along line VIII-VIII in FIG. 7. As shown in FIG. 7, in the working part 13 of the present embodiment, the blade guard 37 is integrally formed with the blade holder 35. In other words, the side upright pieces 44 forming an essential part of the blade holder 35 are formed integrally with the blade guard 37. The blade guard 37 is formed as a stamp formed steel member. More specifically, the base end portion 51 of the blade guard 37 is integrally formed with the side upright pieces 44 along either side edge of the blade guard 37, and the end upright piece 45 along the base end edge of the blade guard 37. The blade guard 37 is placed on the upper surface of the blade mounting portion 25 so that the base end portion 51 of the blade guard 37 slides along the upper surface of the blade mounting portion 25. The blade 36 is placed on the blade guard 37 in such a manner that the base end portion 46 of the blade 36 overlies the base end portion 51 of the blade guard 37, and the free end portion 47 of the blade 36 overlies the free end portion 52 of the blade guard 37.

As shown in FIG. 8, the height or the axial length of the spacer collar 31 of the nut 29 is slightly larger than the combined thickness of the base end portion 51 of the blade guard 37 and the base end portion 46 of the blade 36.

According to the second embodiment, the blade guard 37 is disposed on the side of the disk 20 with respect to the blade 36, and the side upright pieces 44 forming the blade holder 35 are formed integrally with the blade guard 37. By configuring the working part 13 in this manner, the number of component parts is reduced. Also, the work of assembling the blade 36 to the disk 20 is simplified.

The present invention has been described in terms of specific embodiments, but is not limited by such embodiments, and can be modified in various ways without departing from the scope of the present invention. For example, in the above described embodiment, the lawnmower 10 was an autonomous lawnmower, but may also be more conventional lawnmowers such as walk behind mowers and riding mowers. Further, in the above embodiments, the mowing motor 15 consisted of an electric motor, but may also consist of an internal combustion engine.

Further, in the above embodiments, the blade 36 and the blade guard 37 were attached to the upper surface of the disk 20, but the blade 36 and the blade guard 37 may also be attached to the lower surface of the disk 20. In particular, when the blade guard 37 is integrally provided with the side upright pieces 44 as in the second embodiment, placing the blade guard 37 on the lower surface of the disk 20, and the blade on the lower surface of the blade guard 37 is advantageous because the blade guard 37 is less like to rub against the grass, and a favorable grass cutting quality can be achieved. This structure may be achieved by inverting the structure shown in FIG. 8 upside down.

The retaining feature for retaining the blade guard 37 substantially rotationally fast to the blade 36 is not limited to the side upright pieces 44, but may also consist of an end upright piece projecting from the base end edge of the blade holder 35 or the blade guard 37, and abutting against the base end edge of the blade 36. Alternatively, a pin, an upright piece or any other projection projecting from the blade holder 35 or the blade guard 37, and received in a hole formed in the blade 36 may also serve as the retaining feature.

Further, in the above embodiments, the nut 29 consisted of a stepped nut having the spacer collar 31, but instead of providing the spacer collar 31 to the nut 29, the bolt 28 may have a large diameter portion in the base end portion of the shank 28b thereof. It is also possible to use a separate collar member serving as the spacer collar 31 to be placed between the head 28a of the bolt 28 and the nut 29.

The width of the base end portion 51 of the blade guard 37 was substantially the same as the width of the base end portion 46 of the blade 36 in the above embodiments, but may also be smaller or larger than the width of the base end portion 46 of the blade 36. However, the width of the base end portion 51 of the blade guard 37 should be selected such that the blade guard 37 does not interfere with the cutting edges 36a of the blade 36 when the blade guard 37 has been angularly displaced relative to the blade 36 to the maximum extent.

The invention claimed is:

1. A working part structure of a lawnmower, comprising:
    a disk rotatably supported by a main body of the lawnmower and configured to be rotated by a power source;
    a blade having a base end portion rotatably attached to an outer peripheral part of the disk via a pivot shaft and a free end portion configured to protrude radially outward from an outer peripheral edge of the disk;
    a blade guard having a base end portion rotatably supported by the pivot shaft and a free end portion overlying the free end portion of the blade; and
    a retaining feature configured to substantially prevent a relavive rotation between the blade and the blade guard,
    wherin the retaining feature comprises a blade holder including a holder main body interposed between the blade and the disk and rotatably supported by the pivot shaft and a pair of side upright pieces which are beent from either side edge of the holder main body and extend past either side edge of the blade and either side edge of the blade guard.

2. The working part structure of a lawnmower according to claim 1, wherein the blade holder further includes an end upright piece which is bent from a base end edge of the holder main body and extends past a base end edge of the blade and/or a base end edge of the blade guard.

3. The working part structure of a lawnmower according to claim 1, wherein the blade guard is interposed between the disk and the blade, and the blade holder is integrally formed with the blade guard.

4. The working part structure of a lawnmower according to claim 1, wherein the blade guard is positioned on top of the blade.

5. The working part structure of a lawnmower according to claim 1, wherein the free end portion of the blade guard projects radially outward beyond a free end edge of the blade.

6. The working part structure of a lawnmower according to claim 1, wherein the blade guard is made of a material softer than that of the blade.

7. The working part structure of a lawnmower according to claim 1, wherein the retaining feature is configured to substantially prevent the relative rotation between the free end portion of the blade and the free end portion of the blade guard around the pivot shaft.

8. A working part structure of a lawnmower, comprising:
    a disk rotatably supported by a main body of the lawnmower and configured to be rotated by a power source;
    a blade having a base end portion rotatably attached to an outer peripheral part of the disk via a pivot shaft and a free end portion configured to protrude radially outward from an outer peripheral edge of the disk;
    a blade guard having a base end portion rotatably supported by the pivot shaft and a free end portion overlying the free end portion of the blade; and
    a retaining feature configured to substantially prevent a relative rotation between the blade and the blade guard,
    wherein the blade guard is tapered toward a free end thereof, and is narrower than the blade at least in the free end portion thereof.

9. The working part structure of a lawnmower comprising:
    a disk rotatably supported by a main body of the lawnmower and configured to be rotated by a power source;
    a blade having a base end portion rotatably attached to an outer peripheral part of the disk via a pivot shaft and a free end portion configured to protrude radially outward from an outer peripheral edge of the disk; and
    a blade guard having a base end portion rotatably supported by the pivot shaft and a free end portion overlying a free end portion of the blade,
    wherein the pivot shaft comprises a threaded bolt passed through the base end portions of the blade and the blade guard, and a flanged nut is fastened to the threaded bolt, the flanged nut being provided with a spacer collar.

* * * * *